(12) United States Patent
Subhanjan (10) Patent No.: US 9,286,611 B2
(45) Date of Patent: Mar. 15, 2016

(54) MAP TOPOLOGY FOR NAVIGATING A SEQUENCE OF MULTIMEDIA

(76) Inventor: Sarkar Subhanjan, Bangalore (IN)

( * ) Notice: Subject to any disclaimer, the term of this patent is extended or adjusted under 35 U.S.C. 154(b) by 677 days.

(21) Appl. No.: 13/520,918

(22) PCT Filed: Jan. 7, 2011

(86) PCT No.: PCT/IN2011/000013
§ 371 (c)(1),
(2), (4) Date: Jul. 6, 2012

(87) PCT Pub. No.: WO2011/083497
PCT Pub. Date: Jul. 14, 2011

(65) Prior Publication Data
US 2013/0132298 A1  May 23, 2013

(30) Foreign Application Priority Data
Jan. 7, 2010 (IN) ................ 43/CHE/2010

(51) Int. Cl.
*G06Q 30/00* (2012.01)
*G06Q 30/02* (2012.01)
*G09B 5/00* (2006.01)

(52) U.S. Cl.
CPC .............. *G06Q 30/016* (2013.01); *G06Q 30/02* (2013.01); *G09B 5/00* (2013.01)

(58) Field of Classification Search
CPC combination set(s) only.
See application file for complete search history.

(56) References Cited

U.S. PATENT DOCUMENTS

| | | | |
|---|---|---|---|
| 5,257,185 A * | 10/1993 | Farley et al. | |
| 2006/0234201 A1* | 10/2006 | Pierson et al. | 434/323 |
| 2010/0030578 A1* | 2/2010 | Siddique et al. | 705/3 |
| 2011/0066998 A1* | 3/2011 | Scandura | 717/100 |
| 2011/0307779 A1* | 12/2011 | Scholler et al. | 715/705 |
| 2012/0095817 A1* | 4/2012 | Kamil et al. | 705/14.4 |
| 2012/0322042 A1* | 12/2012 | Subhanjan | 434/308 |

* cited by examiner

*Primary Examiner* — Mark A Fleischer
(74) *Attorney, Agent, or Firm* — The Law Office of Austin Bonderer, PC; Austin Bonderer (57) ABSTRACT

A computer implemented method providing a sequence of multimedia files in a map topology includes layers and sub-layers to enable a user to navigate and play a particular multimedia file that demonstrates a feature of a product. Each layer and sub-layer corresponds to a multimedia file that demonstrates a feature of a product. The sequence of multimedia files are stored in an application server (104). The method includes processing a selection of a layer from the user based on a preview of the layer that includes a first reveal branches field, a first hide branches field, and a first play field, displaying at least one branch of a sub-layer of said layer when the reveal branches field is selected, and playing the particular multimedia file corresponding to any of the layer, the sub-layer, or any further sublayer of the sub-layer when a play field is selected.

13 Claims, 10 Drawing Sheets

MAP TOPOLOGY FOR NAVIGATING A SEQUENCE OF MULTIMEDIA

BACKGROUND

1. Technical Field

The embodiments herein generally relate to a map topology, and more particularly to a map topology for navigating a sequence of multimedia files.

2. Description of the Related Art

Traditionally, for various products (e.g., electronic or otherwise) for consumers, product information has been distributed in paper by way of brochures, manuals, instruction booklets, etc. Typically, an instruction manual or a handbook comes with purchase of any product. The manual may come in one or more popular languages. However, when a user has a query related to any use or feature of a product, it may not be easy for the user to quickly find the answer or information that he or she is looking for. Products have become more technologically complex, however manuals continue to remain the same.

Even if the user locates the manual and then the relevant section in the user manual, he may not be able to easily comprehend and apply the complex instructions. Research suggests that people learn most easily not just by reading but by being shown visually along with audio, preferably in the language that they are most conversant with. There is currently no facility for users to experience audio and video and simultaneously to get the relevant information sought through these multi-sensory channels. Further, the user may not have the option of reading the information in his native language, since manuals are typically distributed only in pre-defined languages for any given country.

If the instruction manual is represented in a multimedia format using audio and/or video, it will become a huge file which will not be easy to navigate and gather relevant information. Often, a user may require specific information in relation to a specific product feature or problem. Traditional multimedia presentation techniques offer limited navigation capabilities. In case of new products having multiple complex features related to various categories, it will become increasingly complex for a user to access and use the relevant information in a practical manner.

SUMMARY

In view of the foregoing, a computer implemented method that includes providing a sequence of multimedia files in a map topology that comprises layers and sub-layers to enable a user to navigate to and play one or more of a particular multimedia file that demonstrates a feature of a product, each layer and sub-layer corresponding to one or more of multimedia file that demonstrates a feature of a product is provided. The sequences of multimedia files are stored in an application server. The method includes processing a selection of a layer from the user based on a preview of the layer, that includes a first reveal branches field, a first hide branches field, and a first play field; displaying one or more branch of a sub-layer of the layer when the reveal branches field is selected, the branch including a second reveal branches field, a second hide branches field, and a second play field; and playing the particular multimedia file corresponding to any of the layer, the sub-layer, or any further sub-layer of the sub-layer when a play field is selected.

The map topology includes a plurality of layers. Each layer corresponds to a different mode of familiarity of the user associated with the product. Each mode includes a different set of multimedia files corresponding to the mode of familiarity.

A keyword from the user corresponding to the feature of the product may be processed. A search result that includes the keyword in one or more of the layer, the sub-layer, or any further sub-layer of the sub-layer of the map topology may be displayed. The branch of the sub-layer is displayed when a cursor is moved on the sub-layer. The particular multimedia file includes one or more time stamps.

Each of the time stamps indicate one or more of the steps associated with the feature of the product. The steps may be displayed to the user when a cursor is moved on the time stamps. Each of the time stamps allow the user to select one or more of the steps which is of interest to the user. A portion of the particular multimedia file corresponding to a step associated with a time stamp to the user may be displayed when the user clicks on the time stamp. A search result that includes a keyword in one or more of the layer, the sub-layer, or any further sub-layer of the sublayer of the map topology, or the different mode of familiarity of the user associated with the product.

In another aspect, a multimedia content delivering system is provided. The system includes a sequence of multimedia files, each multimedia file demonstrating one or more feature of a product; a map module that generates a map topology includes one or more of a layer, a sub-layer, any further sub-layer of the sub-layer, a branch of the sub-layer of the layer when a reveal branches field is selected; a snap module that communicates a different mode of familiarity of a user associated with the product to the map module, wherein the map module generates the map topology based on the different mode of familiarity of the user associated with the product; and a video provider module that plays a particular multimedia file corresponding to any of the layer, the sub-layer, or any further sub-layer of the sub-layer when a play field is selected.

The map topology includes a plurality of layers. Each layer corresponds to a different mode of familiarity of a user associated with the product, and each of the modes includes a different set of multimedia files corresponding to the mode of familiarity. The system further includes a finder and navigation module that processes a keyword from a user and displays a search result that comprises the keyword corresponding to the feature of the product in one or more of the layer, the sub-layer, or any further sub-layer of the sub-layer of the map topology for the different mode of familiarity of the user associated with the product.

The particular multimedia file includes one or more time stamps. Each of the time stamps indicate one or more of a steps associated with the feature of the product. The steps are displayed to the user when a cursor is moved on the time stamps. Each of the time stamps allow the user to select one or more of the steps which, is of interest to the user. The portion of the particular multimedia file is played corresponding to a step associated with a time stamp to the user when the user clicks on the time stamp. The branch of the sub-layer is displayed when a cursor is moved on the sub-layer.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, the embodiments herein achieve this by providing a high production nut shelling machine. Referring now to the drawings, and more particularly to FIG. 1 through FIG. 7, where similar reference, characters denote corresponding features consistently throughout the figures, there are shown preferred embodiments.

Figure 1:
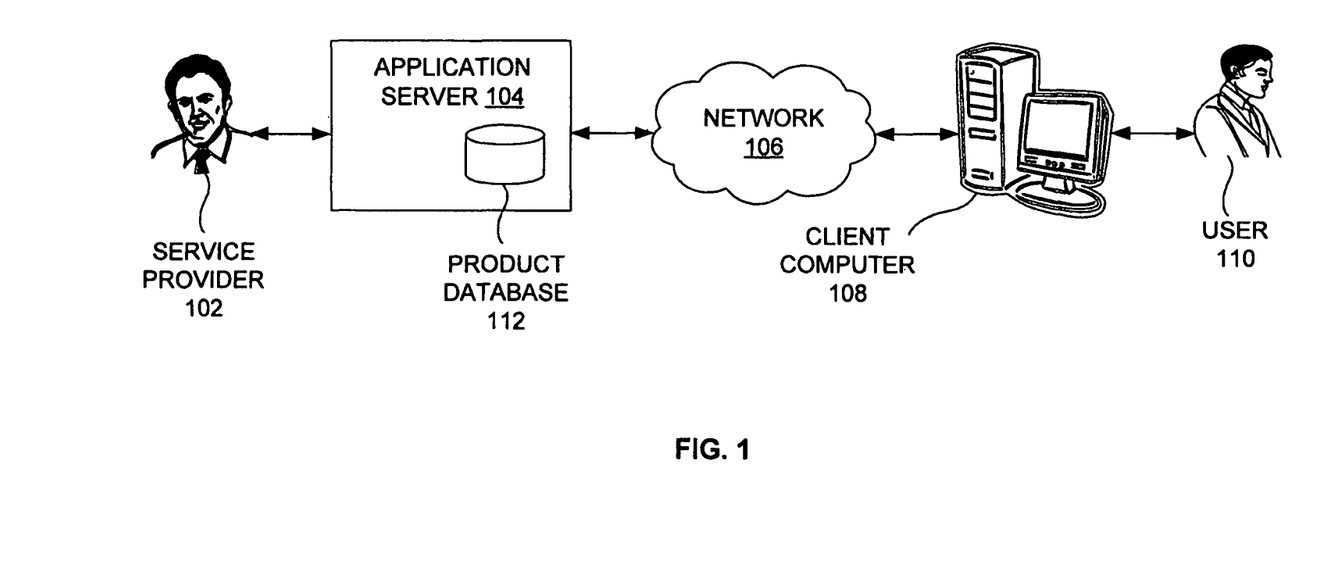
FIG. 1 illustrates a system view of a user communicating with an application server through a network according to an embodiment herein.

FIG. 1 illustrates a system view 100 of a user 110 communicating with an application server 104 through a network 106 according to an embodiment herein. The system view 100 includes a service provider 102, the application server 104, the network 106, a client computer 108 and the user 110. The application server 104 includes a product database 112.

The application server 104 contains a description manual of products described by the service provider 102 of an electronic document. In one embodiment, the electronic document is a web page. The application server 104 may contain text/transcript of the user manual of the product. In another embodiment, the application server 104 may contain a demo film of the user manual of the product. The product database 112 contains information associated with each of the product. In addition, the product database 112 includes information associated with the product.

Figure 2:
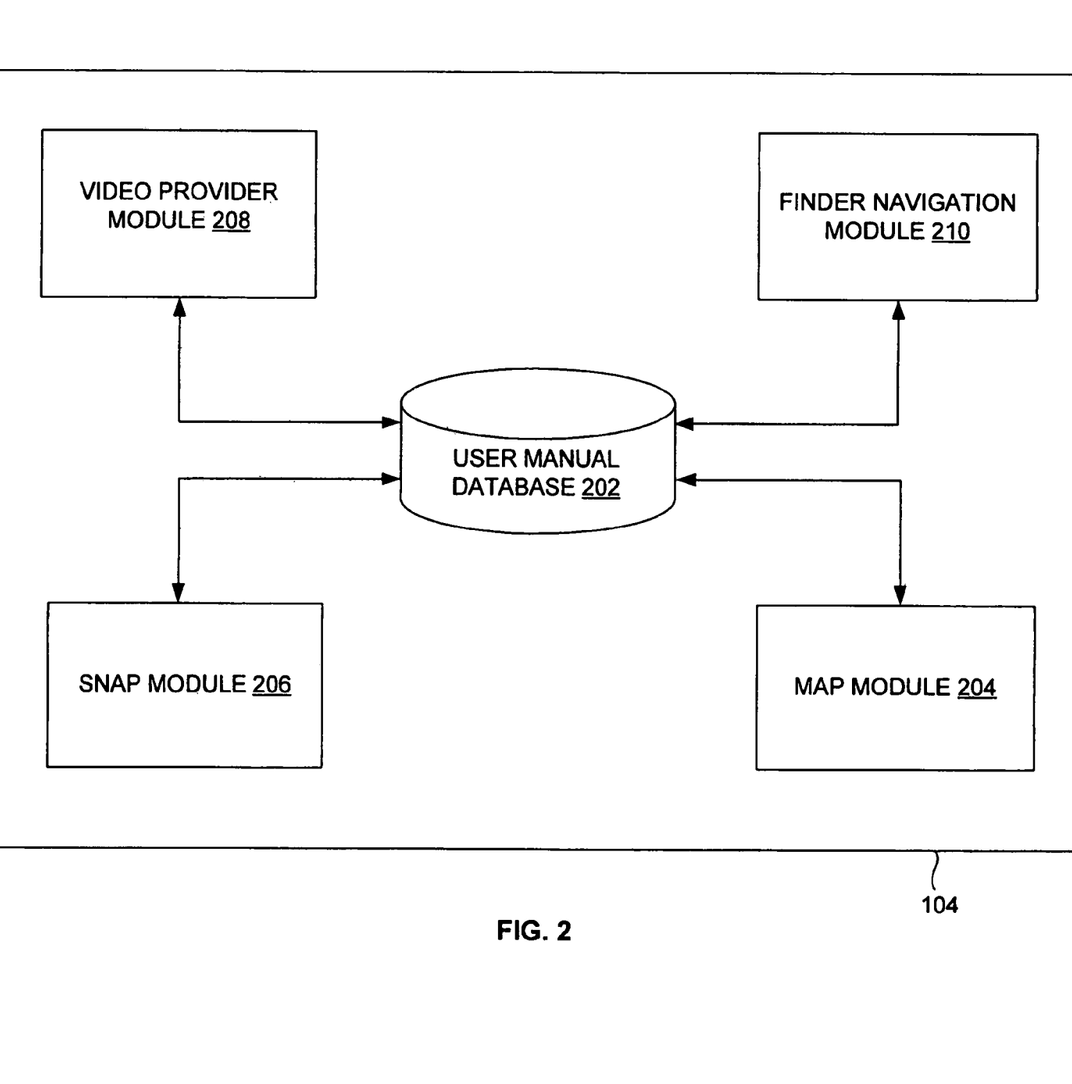
FIG. 2 illustrates an exploded view of the application server of FIG. 1 according an embodiment herein.
Figure 3A:
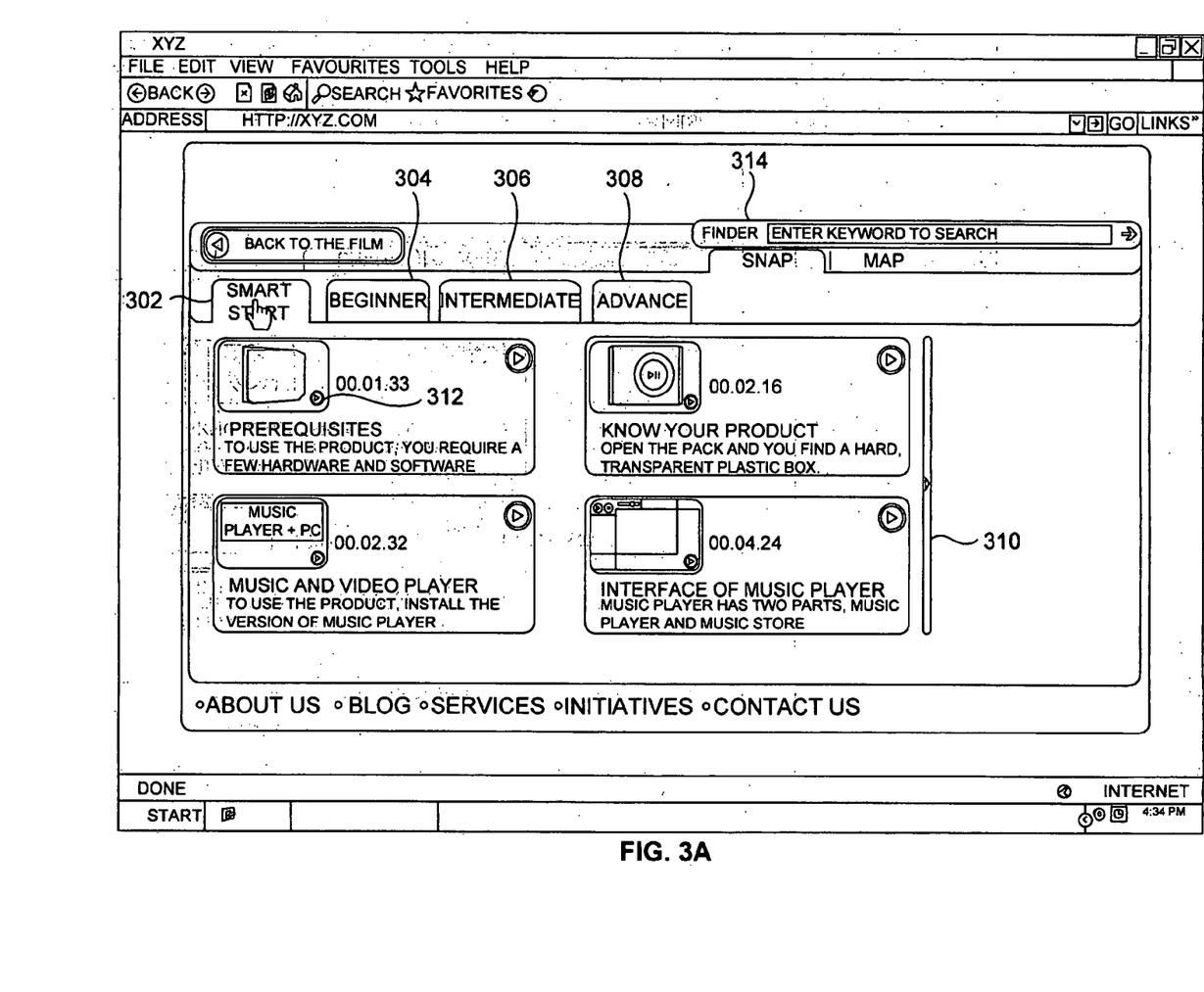
FIG. 3A through 3D illustrates a user interface view having a smart start, a beginner mode, an intermediate mode, and a advance mode according to an embodiment herein.
Figure 3B:
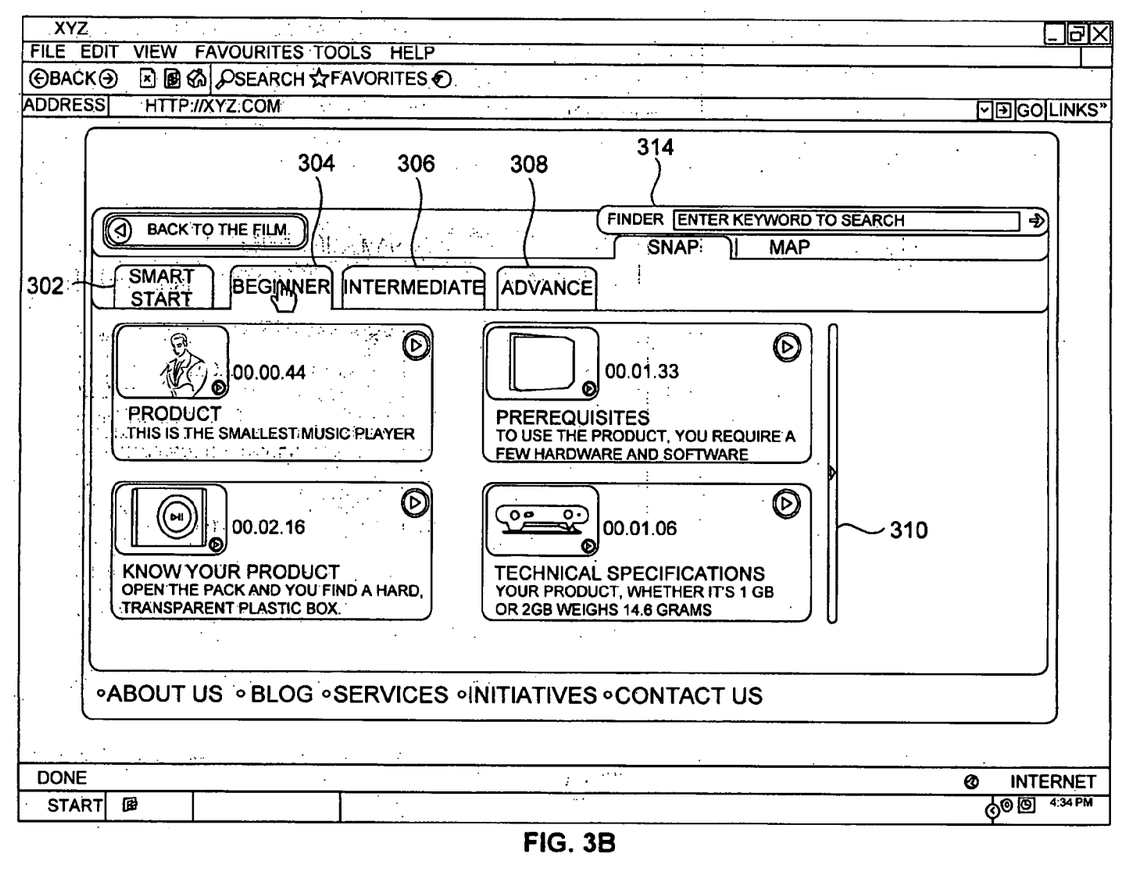
Figure 3C:
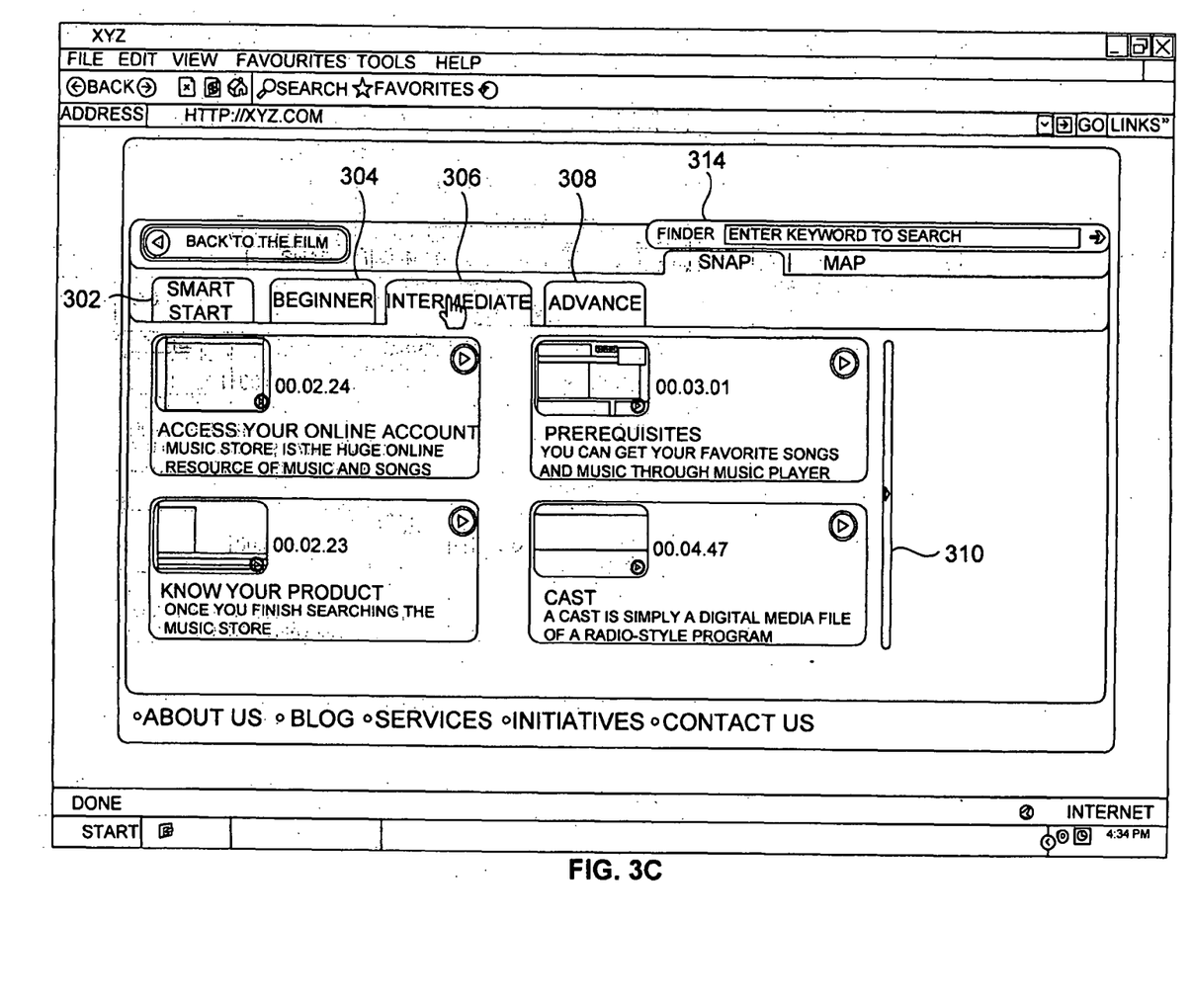
Figure 3D:
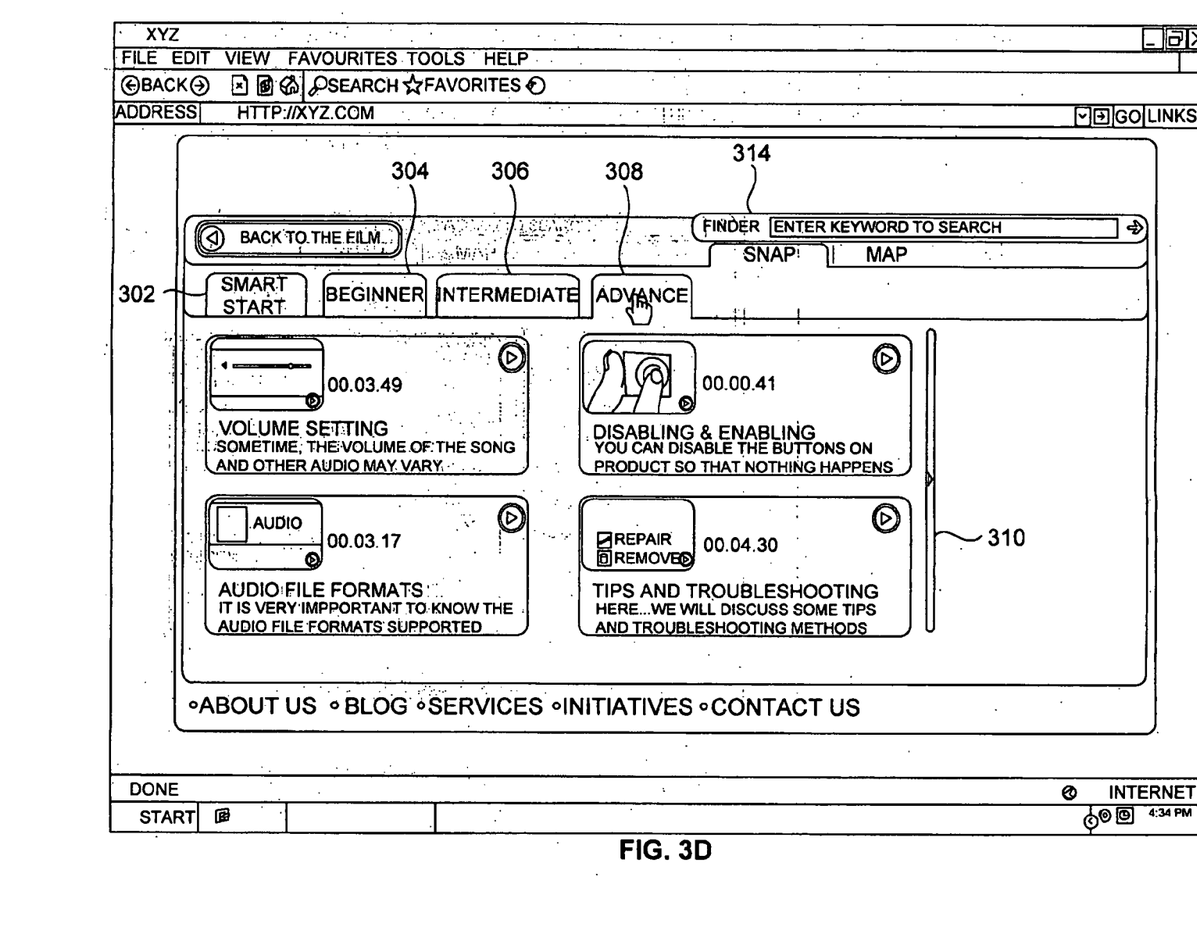

FIG. 2 illustrates an exploded view of the application server 104 of FIG. 1 according an embodiment herein. The application server 104 includes a user manual database 202, a map module 204, a snap module 206, a video provider module 208, and a finder navigation module 208.

The user manual database 202 includes organized information/features associated with the various products. The map module 204 that generates a map topology that includes one or more of a layer, a sub-layer, any further sub-layer of the sub-layer, a branch of the sub-layer of the layer when a reveal branches field is selected. In one embodiment, the map module 204 forms a tree structure of the product with the features forming the branches of the tree. The user 110 then can watch any of the features directly from the map interface. Moreover the user 110 can search the map interface and it will allow the user 110 to check all relevant features one at a time in a pre-defined hierarchy.

The snap module 206 communicates a different mode of familiarity of the user 110 associated with the product to the map module 204. The snap module 206 speeds up a search process required by the user 110 based on the level of the user as well as a SmartStart advisory. The map module 204 may generate the map topology based on the different mode of familiarity of the user 110 associated with the product; and The video provider module 208 plays a particular multimedia file corresponding to any of the layer, the sub-layer, or any further sub-layer of the sub-layer when a play field is selected. The video provider module 208 provides a demonstration of a video clip indicating an audio and/or a visual to the user 110 to view the selected product. In addition, the video provider module 206 offers the user 110 to capture, convert and/or store the audio/visual image of the selected, product with a lossless transmission of the signals when requested by the user 110. The map topology includes a plurality of layers. Each layer corresponds to a different mode of familiarity of the user 110 associated with the product. Each of the modes includes a different set of multimedia files corresponding to the mode of familiarity.

The finder and navigation module 210 processes a keyword from the user 110 and displays a search result that the keyword corresponding to the feature of the product in one or more of the layer, the sub-layer, or any further sub-layer of the sub-layer of the map topology; or the different mode of familiarity of the user 110 associated with the product. The finder and navigation module 208 finds a particular feature of the selected product based on the user's query. In one embodiment, the finder and navigation module 210 compares the query with the elements in the user manual database 202 and retrieves the relevant information associated with the query of the selected product and provides the user 110 an option to navigate between features of the selected product.

FIG. 3A through 3D illustrates a user interface view having a smart start 302, a beginner mode 304, an intermediate mode 306, and a advance mode 308 according to an embodiment herein. The modes 302-308 display a thumbnail preview of the demo films. The modes 302-308 allow the user 110 to experience different level of skills and features of the selected product (e.g., how to use the product, know your product, interface with the product, hardware and software details of the product, technical specifications, how to search in a music store, tips and troubleshooting techniques, enabling and disabling of features associated with selected product, volume settings, etc.).

Additionally, the user interface view of FIG. 3A through 3D further includes a scroll option 310, a thumbnail playback option 312, and a finder navigation bar 314. The scroll option 310 allows the user 110 to scroll up or down for various skills and features of the selected product. The thumbnail playback option 312 allows the user 110 to playback within the thumbnail for previews. The thumbnail playback option 314 enables the user 110 to check whether the user 110 is viewing the right demo film. The finder navigation bar 314 allows the user 110 to search for a particular query associated with the selected product. Based on the selection of mode by the user 110, the user 110 may search a query associated with the selected product in the finder navigation bar field 314.

In one embodiment, the finder navigation bar 314 includes a 2 click feature where the user 110 can search what he/she needs in just 2 Clicks. In an example embodiment, click 1 on the product, the user 110 want information about, it will take the user 110 to the product micro portal page and click 2—the user 110 can find answer to the query about that product by the use of the available TAG Cloud (where it lists the most searched links or keywords). The search will display results only for the selected product. The user 110 can print only these steps which are relevant and interest to user 110 (not shown). In another embodiment, the finder navigation bar 314 may include a most searched button which displays all those queries that other users must have searched already. Further, the relevant sections of the product may be added to user's favorites (not shown).

In one embodiment, the finder navigation bar 314 allows the user 110 to perform a keyword search on a transcript for a particular feature of the selected product. The user 110 may then click on the keyword in the transcript which will navigate to a demo film of the feature. In other words, the user 110 may click on the keyword (e.g., a feature of the product) in the transcript and may view a demo of the feature associated with the selected product. The finder navigation bar 314 allows the user 110 to perform a keyword search (e.g., a feature of the selected product) and corresponding transcript will be display associated with the keyword. The user 110 may click on the keyword in the transcript and can navigate to the demo of that selected feature associated with the product.

Further, the finder navigation bar 314 may include a snap feature, a map feature, a most searched feature. The snap feature may be divided into modes (e.g., SmartStart, beginner, intermediate and/or advanced) based on the user 110 experience with the selected product. The most searched feature contains all those queries that other users may have searched already. In addition, the finder navigation bar 314 provides a 2 click feature where the user 110 at one click can find the product and at a second click can know related information associated with the selected product by the use of the Tag cloud.

Figure 4:
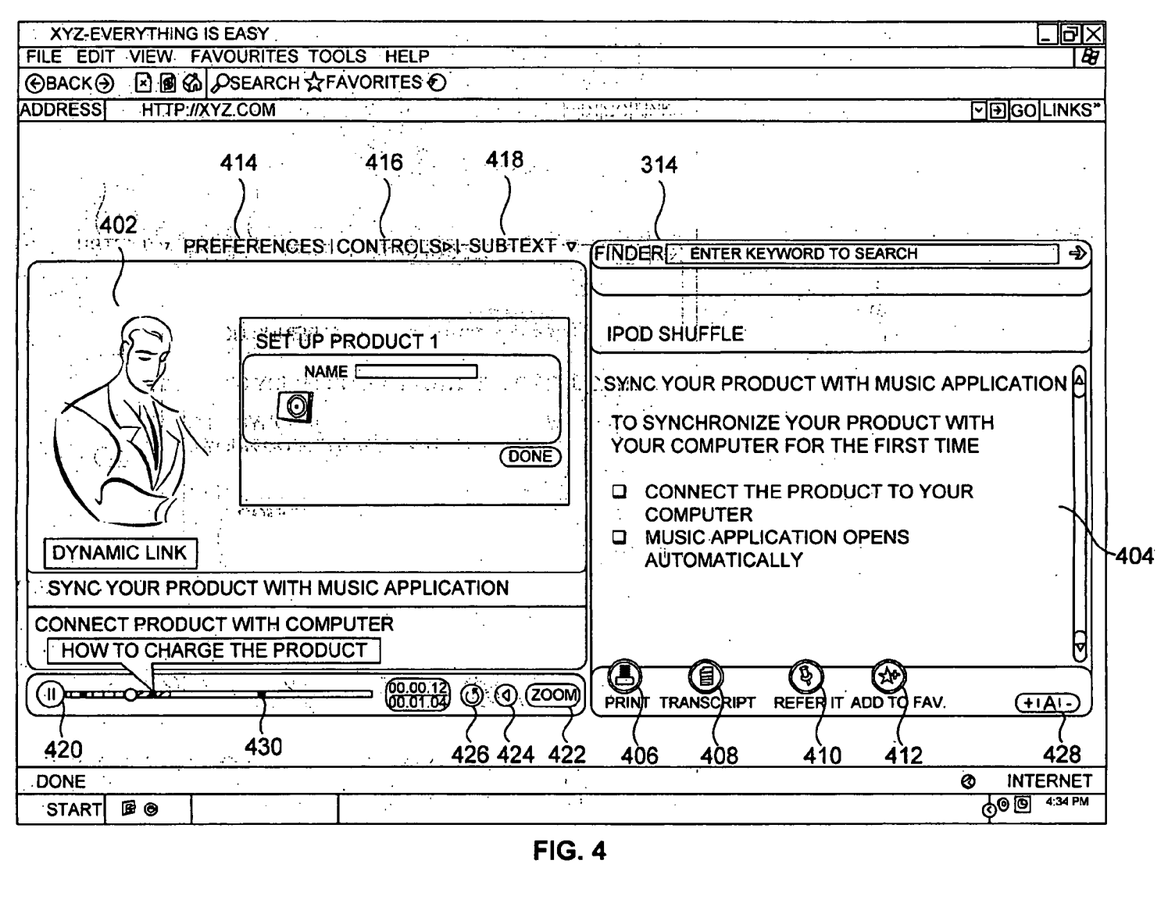
FIG. 4 illustrates a user interface view of the demo film with a text according to an embodiment herein.

FIG. 4 illustrates a user interface view of the demo film with a text according to an embodiment herein. In one embodiment, when the user 110 clicks on any feature of the product that includes a play field, the user 110 is provided with a video that demonstrates a feature associated with the product. The user interface view includes a video player field 402, a text field 404, a print field 406, a transcript field 408, a refer it field 410, and an add to favorites field 412. The video player field 402 further includes a preference field 414, a control field 416, a subtext field 418, a play button 420, a zoom button 422, a volume button 424, and a replay field 426. The user interface view further includes a font field 428, a finder navigation bar 314, and a time stamps field 430.

The text field 404 describes the product chapter wise and is directly linked to the feature being demoed in the film. The user 110 may skip from one chapter to another and the text of the corresponding chapter is displayed. In one embodiment, when the user 110 skips a video portion of a product and navigates to another portion of the video film of the product, the corresponding text tied to the video film may be displayed in the text field 404. The print button 406 provides the user 110 an option to print only the relevant information associated with the selected product and the selected feature.

The transcript field 408 allows the user to stop the film and to make the transcript covering the whole screen on a personal computer (or a laptop). The transcript field 508 enables the user 110 to perform a key word search and takes the user 110 to the relevant page available based on the query. The refer it field 410 provides the user 110 to write notes, comments or resource link. The notes, comments or the resource link may be saved for personal viewing. The comments may be submitted to be viewed by the other users. The resource link may be a useful links of the product posted with relevant URL so that the other users may benefit from one's knowledge. The resource link may be provided in the deep link system of the electronic document.

The add to favorites field 412 enables the user 110 to add the interesting portion into his/her favorites so that it may be retrieved easily later. The preference field 414 enables the user 110 to select a preferred language, an accent, a presenter and/or a subtitle. In one embodiment, me preferred languages, may be at least one of the English, French and/or Spanish, etc. The control field 416 enables the user 110 to control a brightness of a video, a video speed and a zooming of motion of video within the video player field 402. The subtitle field 418 is provided to select the language of the subtitles displayed below the video player 402 within the screen of the video.

The play button 420 enables the user 110 to play and pause the product information film. In one embodiment, a dynamic film link is embedded to the demo film segment. In another embodiment, it is a text/web link. In yet another embodiment, the link may be an external web site link. When a user 110 is watching a demo film, the user 110 can click on that dynamic link and this navigates the user 110 to another window with a demo film that may be useful to the user 110. The user 110 can then come back to the original demo film and watch after closing the dynamic link.

The zoom button 422 enables the user 110 to view the focused area of the film (e.g., a product shot) by zooming in and zooming out the video film. The volume button 424 enables the user 110 to adjust the volume of the video film. The replay field 426 enables the user 110 to replay the full film Or rewind the film by dragging (e.g., and/or navigating) the play bar in required direction or steps/specific points. The font field 428 allows the user 110 to increase and/or decrease the font size in the text field 404.

The time stamps field 430 includes different time points for a selected film by the user 110. The time stamps indicate a number of steps in the particular film of the selection feature of the product. These time stamps allow the user 110 to choose the film part (or step) of the selected feature associated with the product which is of interest to him/her. For an example, if the user 110 selects a particular demo film (e.g., on how to connect your product to your personal computer) and the demo film includes 3 time stamps with the film segment. Each of the time stamps provides a video demonstration of each of the step of that particular feature of the product. In another example, the 3 time points may include put your product on the dock by inserting the jack in the input-output port, plug in the dock USB connector to the USB port of your personal computer, and the application program opens automatically.

The user 110 may experience a mouse hover on the time points and the step or process text of that particular film will be displayed to the user 110. The user 110 may then select the desired time point and click the time point to play that particular feature within the film segment. In other words, the user 110 may select the first time point or the second time point or the third time point. Based on the selection performed by the user 110, the particular step or process associated with the feature of the product at that time stamp will be played.

Figure 5:
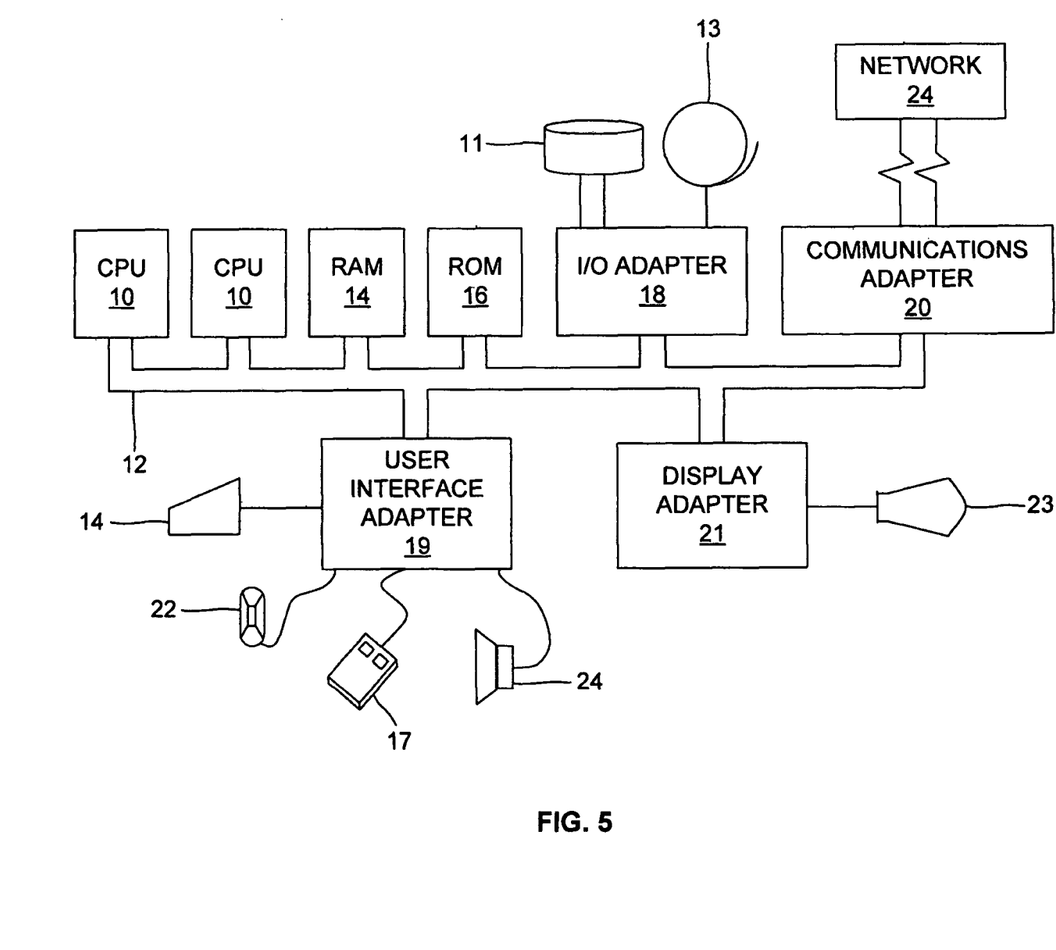
FIG. 5 illustrates a user interface view of the map having a finder navigation bar according to an embodiment herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only-memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 6:
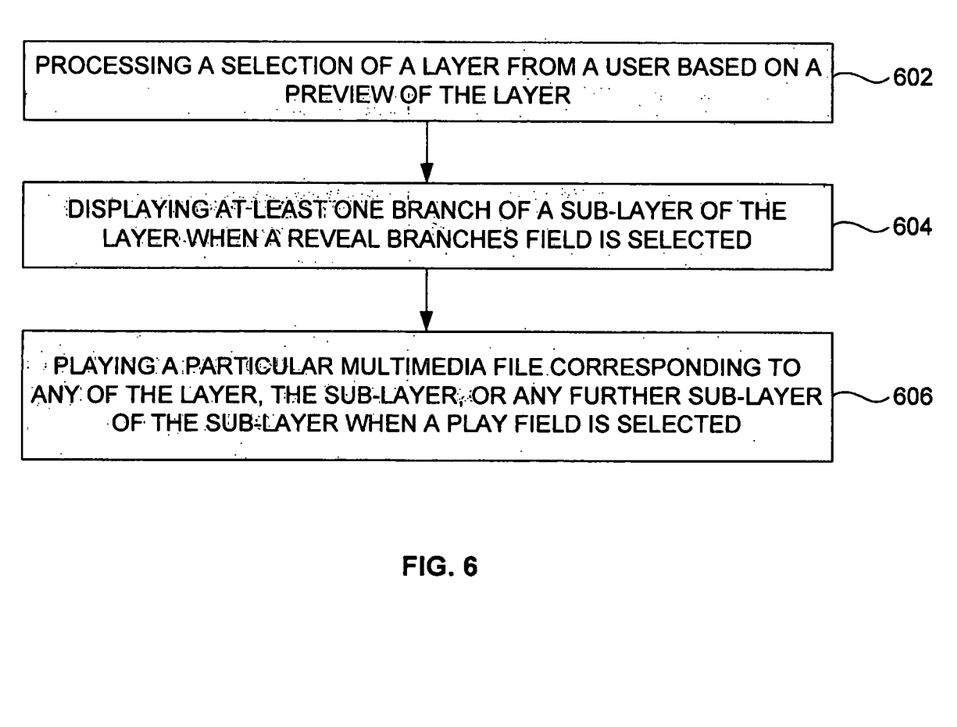
FIG. 6 illustrates a schematic diagram of a computer architecture used in accordance with the embodiment herein.

FIG. 6 is a flow diagram illustrating a computer implemented method that includes providing a sequence of multimedia files in a map topology that includes layers and sub-layers to enable a user 110 to navigate to and play at least a particular multimedia file that demonstrates a feature of a product according to an embodiment herein. Each layer and sub-layer correspond to at least one multimedia file that demonstrates a feature of a product. The sequence of multimedia files are stored in the application server 104 of FIG. 1. In step 602, a selection of a layer from the user 110 is processed based on a preview of the layer. The layer includes a first reveal branches field, a first hide branches field, and a first play field.

In step 604, at least one branch of a sub-layer of the layer is displayed when the reveal branches field is selected. The branch may include a second reveal branches field, a second hide branches field, and a second play field. In step 606, the particular multimedia file corresponding to any of the layer, the sub-layer, or any further sub-layer of the sub-layer is played when a play field is selected.

The map topology includes a plurality of layers. Each layer corresponds to a different mode of familiarity of the user 110 associated with the product. Each of the modes include a different set of multimedia files corresponding to the mode of familiarity. A keyword from the user 110 corresponding to the feature of the product may be processed, and a search result that includes the keyword in at least one of the layer, the sub-layer, or any further sub-layer of the sub-layer of the map topology may be displayed. The branch of the sub-layer is displayed when a cursor is moved on the sub-layer.

The particular multimedia file includes one or more time stamps. Each of the time stamps indicate at least one of a steps associated with the feature of the product. The steps may be displayed to the user 110 when a cursor is moved on the time stamps. Each of the time stamps allow the user 110 to select at least one of the steps which is of interest to the user 110. A portion of the particular multimedia file corresponding to a step associated with a time stamp may be displayed to the user 110 when the user 110 clicks on the time stamp. A search result that includes a keyword in at least one of that layer, the sub-layer, or any further sub-layer of the sub-layer of said the topology, or the different mode of familiarity of the user 110 associated with the product.

Figure 7:
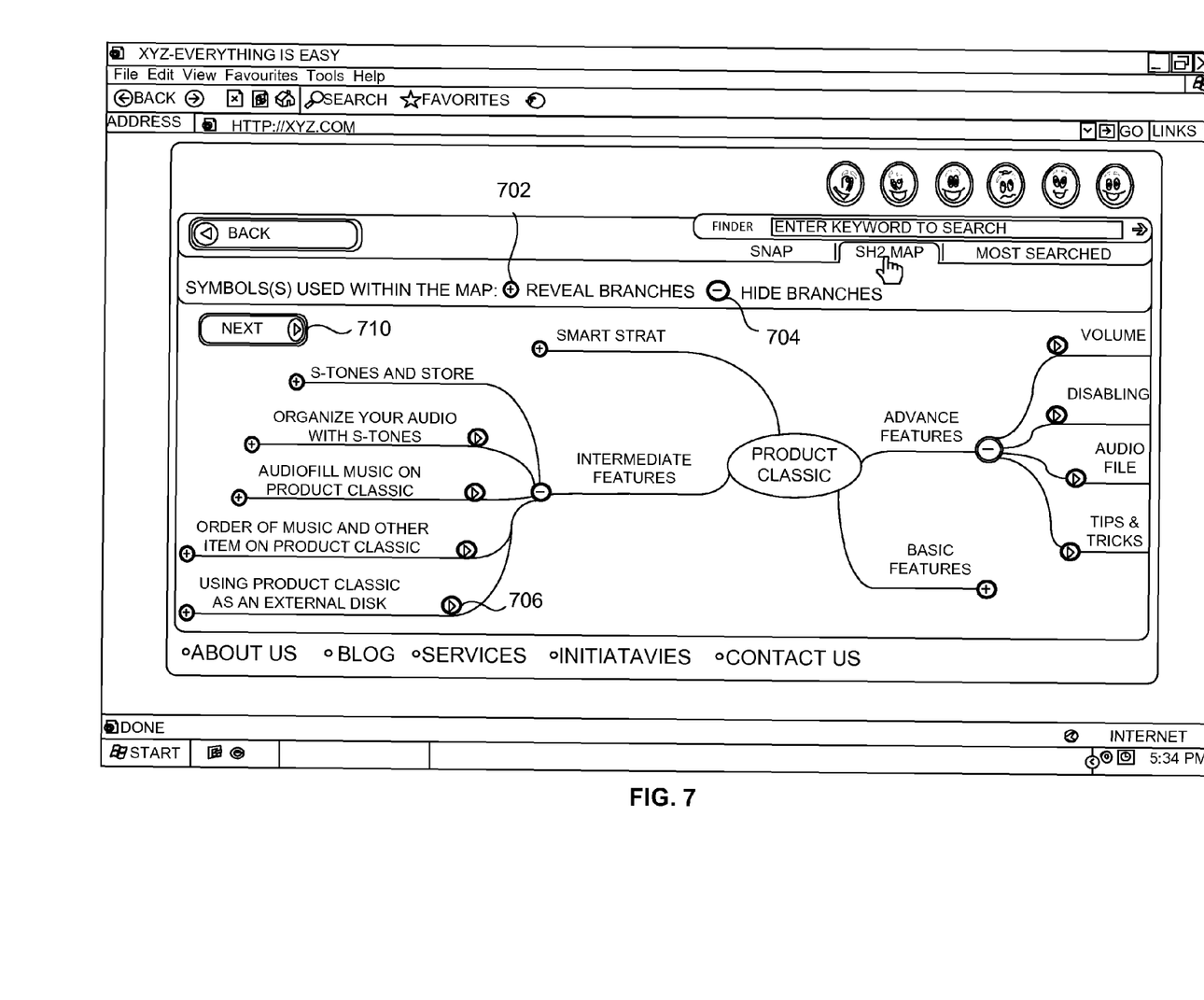
FIG. 7 is a flow diagram illustrating a computer implemented method that includes providing a sequence of multimedia files in a map topology that includes layers and sub-layers to enable a user to navigate to and play at least a particular multimedia file that demonstrates a feature of a product according to an embodiment herein.

FIG. 7 illustrates a user interface view of the map having a finder navigation bar according to an embodiment herein. The map provides the topology of the entire product like functional, to discover all the functions of the product layer by layer. The map is a tree structure of the product with the features forming the branches of the tree. The map includes a reveal branches field 702, a hide branches field 704, and a play field 706. It also includes a new hover feature that allows users to hover with their mouse or pointing device on the reveal/hide branches icon to view the next layer without actually clicking on the icon. To access the layer however the user will need to click on the (+) icon.

The reveal branches field 702 exposes the branches of the selected product. The hide branches field 704 conceals the branches of the selected product. The main branches of the tree may be at least one of a smart start branch, a beginner features branch, an intermediate features branch and an advance features branch. These four branches includes at least one of the reveal branches field 702 and the hide branches field 704 to navigate between the main branches and the sub branches of the tree. In an example embodiment, when the user 110 experiences a mouse hover on any one mode, it will show the next layer where the user 110 may check that is of his/her interest. When the user clicks on any one mode, the layer opens and then the user 110 can click on the sub layer and click on any of the feature of the product to watch that the film associated with that sub layer.

For example, the user 110 may go to a product and click on a beginner mode and then click on audio settings and then click on how to adjust the audio settings, the user 110 will be navigated to the demo film associated with adjusting the audio settings. In one embodiment, the user 110 may also perform a keyword search for a particular product, the search result will display the keywords within the layers and sub layers of all the modes (e.g., SmartStart, beginner, intermediate, and advanced mode). For e.g., when the user 110 performs a keyword search (e.g., volume), the map will display results within the layer and the sub layers where the keyword volume appears in all the modes. The map also provides a next button option 710 which when clicked by the user 110 displays the keyword where the term volume appears. When the next term appears, the previous branch is closed and a new branch within the tree is opened thus displaying the result till the user 110 finds the layer he/she is looking for.

The play field 706 for each of main branches and sub branches provides an option to play the demo of the feature based on user's interest. The sub branches of the tree may be features listed in the smartstart for the smart start branch, the features listed in beginner mode for the beginner feature branch, the features listed in intermediate mode for intermediate branch and/or the features listed in advance mode for the advance feature branch. The map may cover all the features of the selected product and the user can retrieve the description of the particular feature by selecting the corresponding play field. The map also allows the user 110 to mouse over the fields and know the various features of the product without having to click on the options. For an example embodiment, the user 110 may experience a mouse over a feature of the product (e.g., connect the product), and the map displays the additional option within that feature (e.g., connect to earphones and connect to PC via USB).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

I claim:

1. A method for information retrieval on usage of a specific feature of a specific product from a sequence of multimedia files based on a map topology from an application server, said method comprising:

presenting said map topology from said application server at a display unit of a user device, wherein said map topology is specific to said product and comprises (a) a first branch comprising a first sub-branch that comprises a beginner level video demonstrating a feature of said product, (b) a second branch comprising a second sub-branch that comprises an intermediate level video demonstrating said feature of said product, and (c) a third branch comprising a third sub-branch that comprises an advanced level video demonstrating said feature of said product;

processing a first selection of said first sub-branch or said second sub-branch or said third sub-branch from a user;

displaying an icon of a selected video from said beginner level video or said intermediate level video or said advanced level video based on said first selection of said first sub-branch or said second sub-branch or said third sub-branch displaying, for said selected video, steps in association with assembly or operation of said product adjacent to said selected video at said display unit, wherein said selected video comprises a plurality of video segments, wherein each of said video segments (i) demonstrates at least one step related to said feature of said product and (ii) has an associated timestamp, wherein each of said steps in association with assembly or operation of said product has an associated timestamp;

processing a second selection of a specific step from said steps in association with assembly or operation of said product;

identifying a specific video segment, from said plurality of video segments, that corresponds to said specific step by detecting a video segment having a timestamp that corresponds to a timestamp of said specific step; and playing said specific video segment corresponding to said specific step in association with assembly or operation of said product from said timestamp associated with said specific video segment or said specific step.

2. The method of claim 1, wherein said map topology comprises said first branch comprising said beginner level video demonstrating said feature, said second branch comprising said intermediate level video demonstrating said feature, and said third branch comprising said advanced level video demonstrating said feature, wherein each of said first branch, said second branch and said third branch corresponding to a different mode of familiarity of said user associated with said product and its features, and each said first branch, said second branch and said third branch comprises a different set of multimedia files corresponding to said mode of familiarity.

3. The method of claim 1, further comprising processing a keyword from said user corresponding to said feature of said product; and displaying a search result that comprises said keyword in at least one of said first branch, said second branch, said third branch, said first sub branch, said second sub-branch, or said third sub-branch of said map topology.

4. The method of claim 1, wherein each of said first sub-branch, said second sub-branch and said third sub-branch comprises a branch that is displayed when a cursor is moved on a corresponding sub-branch.

5. The method of claim 1, wherein one or more steps that are specific to said specific video segment is displayed to said user when a cursor is moved on said specific video segment.

6. The method of claim 1, further comprising displaying a portion of said selected video that is specific to a step in association with assembly or operation of said product in response to a selection of said step.

7. The method of claim 1, wherein a selection of a particular video segment from said selected video displays at least one step having an associated timestamp that corresponds to a timestamp of said particular video segment.

8. A multimedia content delivering system for information retrieval on usage of a specific feature of a specific product from a sequence of multimedia files based on a map topology from an application server comprising a processor, an input means, a display, and a memory that stores a pre-indexed database that comprises a sequence of multimedia files, each multimedia file demonstrating at least a feature of a product, said system comprising;

a map module that generates a map topology comprising (a) a first branch comprising a first sub-branch that comprises a beginner level video demonstrating a feature of said product, (b) a second branch comprising a second sub-branch that comprises an intermediate level video demonstrating said feature of said product, and (c) a third branch comprising a third sub-branch that comprises an advanced level video demonstrating said feature of said product; and a video provider module that (i) displays an icon of a selected video from said beginner level video or said intermediate level video or said advanced level video based on a selection of said first sub-branch or said second sub-branch or said third sub-branch;

(ii) displays, for said selected video, steps in association with assembly or operation of said product adjacent to said selected video at said display unit, wherein said selected video comprises a plurality of video segments, wherein each of said video segments (i) demonstrates at least one step related to said feature of said product and (ii) has an associated timestamp, wherein each of said steps in association with assembly or operation of said product has an associated timestamp;

(iii) processes a selection of a specific step from said steps in association with assembly or operation of said product;

(iv) identifies a specific video segment, from said plurality of video segments, that corresponds to said specific step by detecting a video segment having a timestamp that corresponds to a timestamp of said specific step; and (v) plays said specific video segment corresponding to said specific step in association with assembly or operation of said product from said timestamp associated with said specific video segment or said specific step.

9. The system of claim 8, wherein said map topology comprises said first branch comprising said beginner level video demonstrating said feature, said second branch comprising said intermediate level video demonstrating said feature, and said third branch comprising said advanced level video demonstrating said feature, wherein each of said first branch, said second branch and said third branch corresponding to a different mode of familiarity of said user associated with said product and its features, and each said first branch, said second branch and said third branch comprises a different set of multimedia files corresponding to said mode of familiarity.

10. The system of claim 8, further comprises a finder and navigation module that processes a keyword from a user and displays a search result that comprises said keyword corresponding to said feature of said product in at least one of said first branch, said second branch, said third branch, said first sub-branch, said second sub-branch, or said third sub-branch of said sub layer of said map topology, or said different mode of familiarity of said user associated with said product.

11. The system of claim 8, wherein one or more steps that are specific to said specific video segment of said selected video are displayed to said user when a cursor is moved on said specific video segment.

12. The system of claim 8, wherein a portion of said selected video that is specific to a step in association with assembly or operation of said product in response to a selection of said step.

13. The system of claim 8, wherein each of said first sub-branch, said second sub-branch and said third sub-branch comprises a branch that is displayed when a cursor is moved on a corresponding sub-branch.

* * * * *